(12) United States Patent
Lin

(10) Patent No.: US 8,289,624 B2
(45) Date of Patent: Oct. 16, 2012

(54) IMAGING LENS SYSTEM

(75) Inventor: Ming-Ching Lin, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 309 days.

(21) Appl. No.: 12/654,913

(22) Filed: Jan. 8, 2010

(65) Prior Publication Data

US 2011/0013071 A1    Jan. 20, 2011

(30) Foreign Application Priority Data

Jul. 17, 2009  (TW) ................................ 98124265 A

(51) Int. Cl.
*G02B 15/14* (2006.01)
*G02B 15/15* (2006.01)

(52) U.S. Cl. ................. 359/682; 359/676; 359/677

(58) Field of Classification Search ............. 359/677, 359/691, 680–682
See application file for complete search history.

(56) References Cited

U.S. PATENT DOCUMENTS

| | | | |
|---|---|---|---|
| 5,748,371 A * | 5/1998 | Cathey et al. | 359/558 |
| 2003/0127584 A1 * | 7/2003 | Dowski et al. | 250/216 |
| 2006/0238638 A1 * | 10/2006 | Sonstroem | 348/335 |
| 2007/0247725 A1 * | 10/2007 | Dowski et al. | 359/676 |
| 2009/0262221 A1 * | 10/2009 | Findlay et al. | 348/240.1 |
| 2010/0259738 A1 * | 10/2010 | Dowski et al. | 355/55 |
| 2010/0271534 A1 * | 10/2010 | Lin | 348/340 |

* cited by examiner

*Primary Examiner* — Jordan Schwartz
(74) *Attorney, Agent, or Firm* — Bacon & Thomas, PLLC

(57) ABSTRACT

This invention provides an imaging lens system including, in order from an object side to an image side: a first lens group with negative refractive power comprising a single first lens element with negative refractive power; a second lens group with positive refractive power comprising, in order from the object side to the image side: a second lens element with positive refractive power; a third lens element with negative refractive power; an aperture stop; and a fourth lens element with negative refractive power; and a third lens group with positive refractive power comprising a single fifth lens element with positive refractive power; wherein by moving the first lens group and the second lens group along the optical axis while keeping the third lens group stationary, the zooming operation is performed such that the system switches between a wide-angle mode and a telephoto mode.

16 Claims, 13 Drawing Sheets

TABLE 1

(Embodiment 1)

f = 2.97~4.13~6.71 mm, Fno = 3.40~4.20~5.90, HFOV = 37.6~28.1~18.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 4.78280 (ASP) | 0.670 | Plastic | 1.544 | 55.9 | -5.73 |
| 2 | | 1.79368 (ASP) | 4.931~3.456~2.023 | | | | |
| 3 | Lens 2 | 1.51434 (ASP) | 1.296 | Plastic | 1.544 | 55.9 | 2.42 |
| 4 | | -7.10720 (ASP) | 0.100 | | | | |
| 5 | Lens 3 | -8.33780 (ASP) | 0.480 | Plastic | 1.632 | 23.4 | -12.16 |
| 6 | | 100.00000 (ASP) | 0.123 | | | | |
| 7 | Ape. Stop | Plano | 0.050 | | | | |
| 8 | WFC Mask | Plano | 0.250 | Silica | 1.458 | 67.8 | - |
| 9 | | Plano | 0.070 | | | | |
| 10 | Lens 4 | 4.69310 (ASP) | 0.320 | Plastic | 1.632 | 23.4 | -4.31 |
| 11 | | 1.67697 (ASP) | 0.450~1.345~3.358 | | | | |
| 12 | Lens 5 | 18.55210 (ASP) | 0.709 | Plastic | 1.530 | 55.8 | 10.61 |
| 13 | | -7.96200 (ASP) | 1.024 | | | | |
| 14 | IR-filter | Plano | 0.300 | Glass | 1.517 | 64.2 | - |
| 15 | | Plano | 0.658 | | | | |
| 16 | Image | Plano | | | | | |

Fig.9

TABLE 2

| Aspheric Coefficients | | | | | |
|---|---|---|---|---|---|
| Surface # | 1 | 2 | 3 | 4 | 5 |
| k = | -9.97874E+00 | -7.58221E-01 | -7.71889E-01 | 1.14849E+01 | 0.00000E+00 |
| A4 = | -5.44258E-03 | -1.72937E-02 | 1.08538E-02 | -1.44582E-02 | 1.18881E-03 |
| A6 = | 5.71724E-04 | 2.20736E-03 | 1.78419E-02 | 4.25559E-02 | 9.63004E-02 |
| A8 = | -1.69791E-05 | -2.16748E-04 | -1.34952E-02 | 1.10052E-02 | -4.37542E-03 |
| A10= | | 3.67931E-05 | 4.93812E-03 | -1.24398E-02 | 5.98783E-03 |
| A12= | | | | | -2.75229E-02 |
| Surface # | 6 | 10 | 11 | 12 | 13 |
| k = | 0.00000E+00 | -1.00000E+00 | 0.00000E+00 | 5.82304E+01 | -1.00000E+00 |
| A4 = | 1.03408E-01 | -1.00937E-01 | -1.54162E-01 | -9.61048E-03 | -3.78206E-03 |
| A6 = | 2.04897E-02 | -6.14335E-02 | 5.41021E-02 | 1.03225E-02 | -3.64408E-03 |
| A8 = | 3.96636E-01 | 7.54792E-01 | 1.82073E-01 | -3.90808E-03 | 5.21217E-03 |
| A10= | -4.38126E-01 | -1.51595E+00 | -4.35196E-01 | 5.10022E-04 | -1.88362E-03 |
| A12= | | 1.24677E+00 | 3.24067E-01 | | 2.21669E-04 |

Fig.10

TABLE 3

(Embodiment 2)

f = 3.04~4.05~6.55 mm, Fno = 3.40~4.30~5.70, HFOV = 37.3~29.2~18.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 25.00000 (ASP) | 0.648 | Glass | 1.497 | 81.5 | -4.76 |
| 2 | | 2.14449 (ASP) | 3.769~2.738~1.567 | | | | |
| 3 | Lens 2 | 1.58107 (ASP) | 1.402 | Plastic | 1.544 | 55.9 | 2.45 |
| 4 | | -5.86863 (ASP) | 0.154 | | | | |
| 5 | Lens 3 | -2.85582 (ASP) | 0.392 | Plastic | 1.632 | 23.4 | -6.52 |
| 6 | | -9.78240 (ASP) | 0.103 | | | | |
| 7 | Ape. Stop | Plano | 0.100 | | | | |
| 8 | WFC Mask | Plano | 0.250 | Silica | 1.458 | 67.8 | - |
| 9 | | Plano | 0.070 | | | | |
| 10 | Lens 4 | 2.36625 (ASP) | 0.354 | Plastic | 1.632 | 23.4 | -13.90 |
| 11 | | 1.75602 (ASP) | 0.559~1.461~3.714 | | | | |
| 12 | Lens 5 | 34.29350 (ASP) | 0.646 | Plastic | 1.530 | 55.8 | 12.44 |
| 13 | | -8.10612 (ASP) | 1.400 | | | | |
| 14 | IR-filter | Plano | 0.300 | Glass | 1.517 | 64.2 | - |
| 15 | | Plano | 0.606 | | | | |
| 16 | Image | Plano | | | | | |

Fig.11

TABLE 4

Aspheric Coefficients

| Surface # | 1 | 2 | 3 | 4 | 5 |
|---|---|---|---|---|---|
| k = | -5.74451E+00 | -7.00448E-01 | -8.48495E-01 | 1.84302E+01 | 0.00000E+00 |
| A4 = | -1.27899E-03 | 1.76645E-03 | 1.61094E-02 | 7.08498E-03 | 6.17857E-02 |
| A6 = | 4.83460E-04 | 1.32754E-03 | 3.67828E-03 | 2.55352E-02 | 6.00217E-02 |
| A8 = | -2.23746E-05 | 3.22801E-05 | | | -1.56774E-02 |
| A10= | | 9.12648E-05 | | | |
| A12= | | | | | |

| Surface # | 6 | 10 | 11 | 12 | 13 |
|---|---|---|---|---|---|
| k = | 0.00000E+00 | -1.00000E+00 | 0.00000E+00 | 0.00000E+00 | -1.00000E+00 |
| A4 = | 7.12508E-02 | -1.39681E-01 | -1.48024E-01 | -2.17065E-02 | -1.54498E-02 |
| A6 = | 8.96451E-02 | -2.61315E-02 | -1.60524E-02 | 1.16863E-02 | 9.66324E-04 |
| A8 = | 3.56764E-02 | 4.28823E-01 | 2.50577E-01 | -4.81877E-03 | 2.38101E-03 |
| A10= | | -7.38358E-01 | -3.55794E-01 | 5.25749E-04 | -1.43866E-03 |
| A12= | | 4.77401E-01 | 1.81451E-01 | 4.67687E-05 | 2.20605E-04 |

Fig.12

TABLE 5

|  | Embodiment 1 | Embodiment 2 |
|---|---|---|
| f | 2.97~4.13~6.71 | 3.04~4.05~6.55 |
| Fno | 3.40~4.20~5.90 | 3.40~4.30~5.70 |
| HFOV | 37.6~28.1~18.2 | 37.3~29.2~18.6 |
| $f_W$ | 2.97 | 3.04 |
| $|f_{G1}/f_{G2}|$ | 1.68 | 1.43 |
| $f_W/f_{G2}$ | 0.87 | 0.91 |
| $f_W/f_{G3}$ | 0.28 | 0.24 |
| V3 | 23.4 | 23.4 |
| V4 | 23.4 | 23.4 |
| R1/R2 | 2.67 | 11.66 |
| R3/R4 | -0.21 | -0.27 |
| R9/R10 | -2.33 | -4.23 |
| R3/$f_W$ | 0.51 | 0.52 |
| $TTL_W/TTL_T$ | 1.00 | 0.92 |
| $TTL_W/ImgH$ | 5.06 | 4.76 |

Fig.13

IMAGING LENS SYSTEM

BACKGROUND OF THE INVENTION

1. Field of the Invention

The present invention relates to an imaging lens system, and more particularly, to a compact imaging lens system used in a mobile phone camera.

2. Description of the Prior Art

In recent years, with the popularity of camera mobile phones, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality. As there is an ongoing trend toward compact yet powerful electronic products, the majority of high-end electronic products have been equipped with compact imaging lenses with auto focusing (AF) or zooming function so as to obtain sharp images of distant and close objects or to further magnify distant and close objects at different magnification rates.

SUMMARY OF THE INVENTION

The present invention provides an imaging lens system including, in order from the object side to the image side: a first lens group with negative refractive power comprising a single first lens element with negative refractive power having a convex object-side surface and a concave image-side surface; a second lens group with positive refractive power comprising, in order from the object side to the image side: a second lens element with positive refractive power having a convex object-side surface and a convex image-side surface; a third lens element with negative refractive power having a concave object-side surface; an aperture stop; and a fourth lens element with negative refractive power having a convex object-side surface and a concave image-side surface; and a third lens group with positive refractive power comprising a single fifth lens element with positive refractive power having a convex object-side surface and a convex image-side surface; wherein by moving the first lens group and the second lens group along the optical axis while keeping the third lens group stationary, the zooming operation is performed such that the system switches between a wide-angle mode and a telephoto mode; wherein all lens elements in the second lens group are made of plastic material and the object-side and image-side surfaces thereof are aspheric; and wherein the number of the lens elements with refractive power is N, and it satisfies the relation: $5 \leq N \leq 6$.

Such an arrangement of optical elements can effectively reduce the total track length as well as the sensitivity of the imaging lens system and improve the image quality.

The present invention provides another imaging lens system including, in order from the object side to the image side: a first lens group comprising a first lens element having a convex object-side surface; and a second lens group comprising a second lens element; wherein the imaging lens system further includes an EDOF coding element, and an object is imaged on an electronic sensor.

The aforementioned arrangement of optical elements can extend the depth of field of the imaging lens system, enabling both distant and close objects to fall within the focusing range of the system. Consequently, the drawbacks accompanying the use of a conventional mechanical AF mechanism, such as alignment error, low focusing speed and large size (due to the complicated focusing element), can be improved.

BRIEF DESCRIPTION OF THE DRAWINGS

FIG. 9 is TABLE 1 which lists the optical data of the first embodiment.

FIG. 10 is TABLE 2 which lists the aspheric surface data of the first embodiment.

FIG. 11 is TABLE 3 which lists the optical data of the second embodiment.

FIG. 12 is TABLE 4 which lists the aspheric surface data of the second embodiment.

FIG. 13 is TABLE 5 which lists the data of the respective embodiments resulted from the equations.

DETAILED DESCRIPTION OF THE PREFERRED EMBODIMENTS

Figure 1:
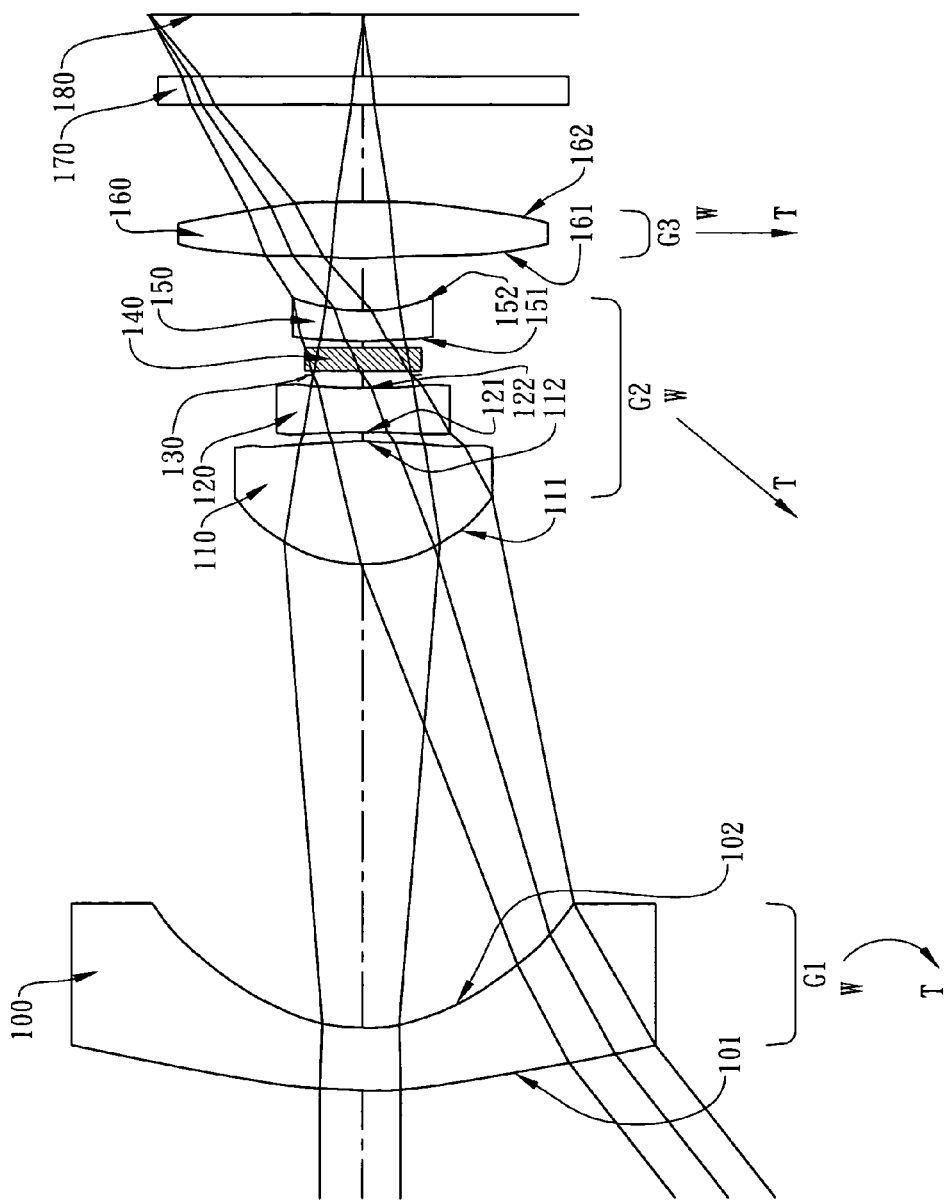
FIG. 1 shows an imaging lens system in accordance with a first embodiment of the present invention.

The present invention provides an imaging lens system including, in order from the object side to the image side: a first lens group with negative refractive power comprising a single first lens element with negative refractive power having a convex object-side surface and a concave image-side surface; a second lens group with positive refractive power comprising, in order from the object side to the image side: a second lens element with positive refractive power having a convex object-side surface and a convex image-side surface; a third lens element with negative refractive power having a concave object-side surface; an aperture stop; and a fourth lens element with negative refractive power having a convex object-side surface and a concave image-side surface; and a third lens group with positive refractive power comprising a single fifth lens element with positive refractive power having a convex object-side surface and a convex image-side surface; wherein by moving the first lens group and the second lens group along the optical axis while keeping the third lens group stationary, the zooming operation is performed such that the system switches between a wide-angle mode and a telephoto mode; wherein all lens elements in the second lens group are made of plastic material and the object-side and image-side surfaces thereof are aspheric; and wherein the number of the lens elements with refractive power is N, and it satisfies the relation: $5 \leq N \leq 6$.

The aforementioned imaging lens system further includes an EDOF coding element to favorably extend the depth of field thereof via the extended depth of focus (EDOF) technology. With the EDOF technology that incorporates a coding element in the system and proper optical design, the image on the electronic sensor can be blurred or provided with a certain feature, such as insensitivity to defocus. A sharper image will then be created after image processing is completed. Consequently, the depth of field of the system can be extended. The EDOF coding element may be an element with wavefront coding (WFC) surface or a WFC mask. In addition, the function of the EDOF coding element can be incorporated in an optical lens assembly so that the lens assembly is similar to general lens assemblies but has the capability to blur the image on the electronic sensor or provides the image with a certain feature. A shaper image will then be created after image processing is completed.

In the aforementioned imaging lens system, the aperture stop is disposed between the third lens element and the fourth lens element so that a wide field of view can be favorably achieved. Such an aperture stop placement facilitates the correction of the distortion and chromatic aberration of magnification, thereby the sensitivity of the imaging lens system can be effectively reduced.

In the aforementioned imaging lens system, the focal length of the first lens group is $f_{G1}$, the focal length of the second lens group is $f_{G2}$, and they preferably satisfy the relation: $1.35<|f_{G1}/f_{G2}|<1.75$.

When the above relation is satisfied, the distribution of the refractive power of the first and second lens groups is more balanced so that the displacement of the second lens group along the optical axis will not be too large when the zooming operation is performed to enable the system to switch between the wide-angle mode and the telephoto mode, thereby the total track length of the system can be effectively reduced. The above relation also facilitates the correction of the field curvature in the wide-angle mode and the spherical aberration in the telephoto mode, so that the image quality can be improved.

In the aforementioned imaging lens system, the focal length of the imaging lens system in the wide-angle mode is $f_W$, the focal length of the second lens group is $f_{G2}$, the focal length of the third lens group is $f_{G3}$, and they preferably satisfy the relations: $0.8<f_W/f_{G2}<1.0$, $0.20<f_W/f_{G3}<0.35$.

When the above relations are satisfied, the distribution of the refractive power of the imaging lens system is more balanced so that the sensitivity of the imaging lens system to the manufacture/assembly errors (e.g. off-center) and environmental changes (e.g. temperature) can be effectively reduced, thereby to improve the manufacturing yields of the present imaging lens system.

In the aforementioned imaging lens system, the radius of curvature of the object-side surface of the first lens element is R1, the radius of curvature of the image-side surface of the first lens element is R2, and they preferably satisfy the relation: $2<R1/R2<15$.

The above relation ensures that the imaging lens system has a sufficient angle of view when being operated in the wide-angle mode. The above relation also prevents the high order aberrations from becoming too large.

In the aforementioned imaging lens system, the radius of curvature of the object-side surface of the second lens element is R3, the radius of curvature of the image-side surface of the second lens element is R4, and they preferably satisfy the relation: $-0.35<R3/R4<-0.15$.

The above relation facilitates the correction of the spherical aberration and high order aberrations and enables a shorter total track length.

In the aforementioned imaging lens system, the radius of curvature of the object-side surface of the fifth lens element is R9, the radius of curvature of the image-side surface of the fifth lens element is R10, and they preferably satisfy the relation: $-5<R9/R10<-2$.

When the above relation is satisfied, the astigmatism and distortion of the system can be favorably corrected. The above relation also effectively reduces the incidence angle at which the light is projected onto the electronic sensor, thereby the photosensitivity of the electronic sensor can be improved to reduce the probability of the occurrence of shading.

In the aforementioned imaging lens system, the Abbe number of the third lens element is V3, the Abbe number of the fourth lens element is V4, and they preferably satisfy the relations: $20<V3<28$, $20<V4<28$.

When the above relations are satisfied, the chromatic aberration of the imaging lens system can be favorably corrected to improve the resolution of the system.

In the aforementioned imaging lens system, the total track length of the imaging lens system in the wide-angle mode is $TTL_W$, which is defined as the on-axis spacing between the object-side surface of the first lens element and the image plane when the imaging lens system is operated in the wide-angle mode, the maximum image height of the imaging lens system is ImgH, which is defined as half of the diagonal length of the effective pixel area of the electronic sensor, and they preferably satisfy the relation: $TTL_W/ImgH<6$.

The above relation enables the imaging lens system to maintain a compact form so that it can be equipped in a compact portable electronic product.

In the aforementioned imaging lens system, the total track length of the imaging lens system in the wide-angle mode is $TTL_W$, which is defined as the on-axis spacing between the object-side surface of the first lens element and the image plane when the imaging lens system is operated in the wide-angle mode, the total track length of the imaging lens system in the telephoto mode is $TIL_T$, which is defined as the on-axis spacing between the object-side surface of the first lens element and the image plane when the imaging lens system is operated in the telephoto mode, and they preferably satisfy the relation: $TTL_W/TTL_T=1$.

When the above relation is satisfied, the switch between the wide-angle mode and the telephoto mode can be performed by simply moving the second lens group along the optical axis while keeping the first lens group stationary, thereby the zoom mechanism of the system can be simplified and the size and manufacturing cost of the imaging lens system can be reduced as well.

The present invention provides another imaging lens system including, in order from the object side to the image side: a first lens group comprising a first lens element having a convex object-side surface; and a second lens group comprising a second lens element; wherein the imaging lens system further includes an EDOF coding element, and an object is imaged on an electronic sensor.

In the aforementioned imaging lens system, the EDOF coding element is configured to favorably extend the depth of field of the imaging lens system. Preferably, the EDOF coding element is disposed in the second lens group. Preferably, the EDOF coding element is disposed on a flat plate element. Preferably, no lens element with refractive power is disposed between the EDOF coding element and the aperture stop.

In the aforementioned imaging lens system, it is preferable that the zooming operation is performed to enable the system to switch between the wide-angle mode and the telephoto mode by moving the first and second lens groups along the optical axis.

In the aforementioned imaging lens system, the radius of curvature of the object-side surface of the first lens element is R1, the radius of curvature of the image-side surface of the first lens element is R2, and they preferably satisfy the relation: $1.5<R1/R2$.

The above relation ensures that the imaging lens system has a sufficient angle of view when being operated in the wide-angle mode.

In the aforementioned imaging lens system, the second lens element has positive refractive power and the radius of curvature of the object-side surface thereof is R3, the focal length of the imaging lens system in the wide-angle mode is $f_W$, and they preferably satisfy the relation: $0.4<R3/f_W<0.6$.

The above relation enables the imaging lens system to get a good balance between the reduction of the total track length and the correction of the aberrations.

In the aforementioned imaging lens system, it is preferable that the first lens group has negative refractive power and the second lens group has positive refractive power; wherein the first lens group comprises a first lens element with negative refractive power having a convex object-side surface and a concave image-side surface; and wherein the second lens group comprises, in order from the object side to the image side: a second lens element with positive refractive power; a third lens element with negative refractive power; an aperture stop; and a fourth lens element with negative refractive power.

In the aforementioned imaging lens system, the aperture stop is disposed between the third lens element and the fourth lens element so that a wide field of view can be favorably achieved. Such an aperture stop placement facilitates the correction of the distortion and chromatic aberration of magnification, thereby the sensitivity of the imaging lens system can be effectively reduced.

In the aforementioned imaging lens system, it is preferable that the number of the lens elements with refractive power is N, and it satisfies the relation: $5 \leqq N \leqq 6$.

In the aforementioned imaging lens system, the total track length of the imaging lens system in the wide-angle mode is $TTL_W$, the maximum image height of the imaging lens system is ImgH, and they preferably satisfy the relation: $TTL_W/ImgH<6$.

The above relation enables the imaging lens system to maintain a compact form so that it can be equipped in a compact portable electronic product.

In the aforementioned imaging lens system, it is preferable that the second lens element has a convex object-side surface and a convex image-side surface. Preferably, the third lens element has a concave object-side surface. Preferably, the fourth lens element has a convex object-side surface and a concave image-side surface.

In the aforementioned imaging lens system, the focal length of the first lens group is $f_{G1}$, the focal length of the second lens group is $f_{G2}$, and they preferably satisfy the relation: $1.35<|f_{G1}/f_{G2}|<1.75$.

When the above relation is satisfied, the distribution of the refractive power of the first and second lens groups is more balanced so that the displacement of the second lens group along the optical axis will not be too large when the zooming operation is performed to enable the system to switch between the wide-angle mode and the telephoto mode, thereby the total track length of the system can be effectively reduced. The above relation also facilitates the correction of the field curvature in the wide-angle mode and the spherical aberration in the telephoto mode, so that the image quality of the system can be improved.

In the aforementioned imaging lens system, the Abbe number of the third lens element is V3, the Abbe number of the fourth lens element is V4, and they preferably satisfy the relations: $20<V3<28$, $20<V4<28$.

When the above relations are satisfied, the chromatic aberration of the imaging lens system can be favorably corrected to improve the resolution of the system.

The present invention provides another imaging lens system including, in order from the object side to the image side: a first lens group comprising a first lens element having a convex object-side surface; and a second lens group comprising a second lens element; wherein the imaging lens system further includes an EDOF coding element and an aperture stop between which no lens element with refractive power is disposed, and an object is imaged on an electronic sensor.

In the aforementioned imaging lens system, the EDOF coding element is configured to favorably extend the depth of field of the imaging lens system.

The present invention provides another imaging lens system including, in order from the object side to the image side: a movable first lens group with negative refractive power comprising a single first lens element with negative refractive power having a convex object-side surface and a concave image-side surface; a movable second lens group with positive refractive power comprising, in order from the object side to the image side: a second lens element with positive refractive power having a convex object-side surface and a convex image-side surface; a third lens element with negative refractive power having a concave object-side surface; an aperture stop; and a fourth lens element with negative refractive power having a convex object-side surface and a concave image-side surface; and a stationary third lens group with positive refractive power comprising a single fifth lens element with positive refractive power having a convex object-side surface and a convex image-side surface; wherein all lens elements in the second lens group are made of plastic material and the object-side and image-side surfaces thereof are aspheric; and wherein the number of the lens elements with refractive power is N, and it satisfies the relation: $5 \leqq N \leqq 6$.

Preferably, the aforementioned imaging lens system further includes an EDOF coding element and an object is imaged on an electronic sensor so that the depth of field of the imaging lens system can be favorably extended. Preferably, no lens element with refractive power is disposed between the EDOF coding element and the aperture stop.

The present invention provides another imaging lens system including, in order from the object side to the image side: a first lens group comprising a first lens element having a convex object-side surface; and a second lens group comprising a second lens element; wherein the imaging lens system further includes an EDOF coding element disposed on a flat plate element, and an object is imaged on an electronic sensor.

In the aforementioned imaging lens system, the EDOF coding element is configured to favorably extend the depth of field of the imaging lens system.

In the present imaging lens system, the lens elements can be made of glass or plastic material. If the lens elements are made of glass, there is more freedom in distributing the refractive power of the system. If plastic material is adopted to produce lens elements, the manufacturing cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens system can be reduced effectively.

In the present imaging lens system, if a lens element has a convex surface, it means the portion of the surface proximate to the axis is convex; if a lens element has a concave surface, it means the portion of the surface proximate to the axis is concave.

Preferred embodiments of the present invention will be described in the following paragraphs by referring to the accompanying drawings.

Figure 2:
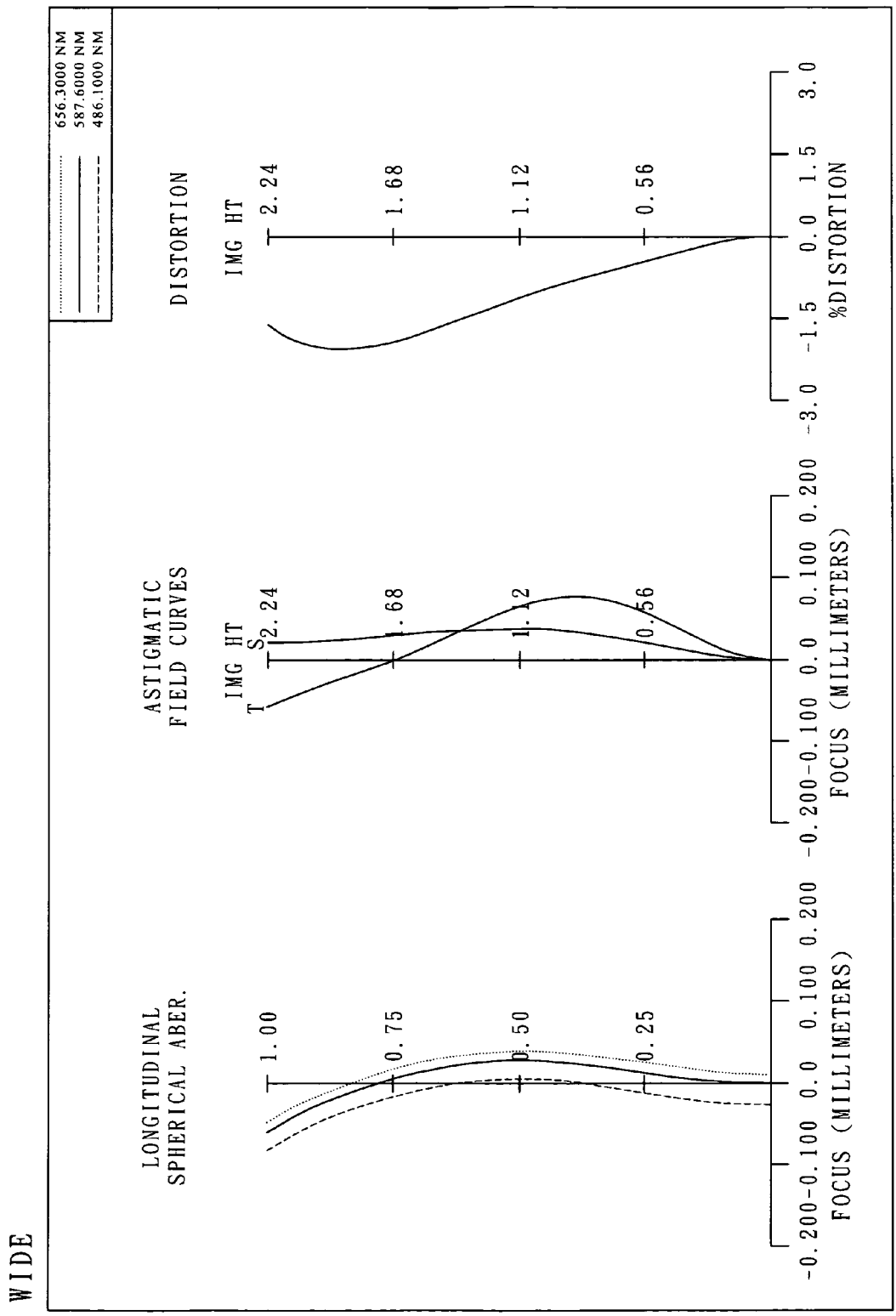
FIG. 2 shows the aberration curves of the first embodiment operated in the wide-angle mode.
Figure 3:
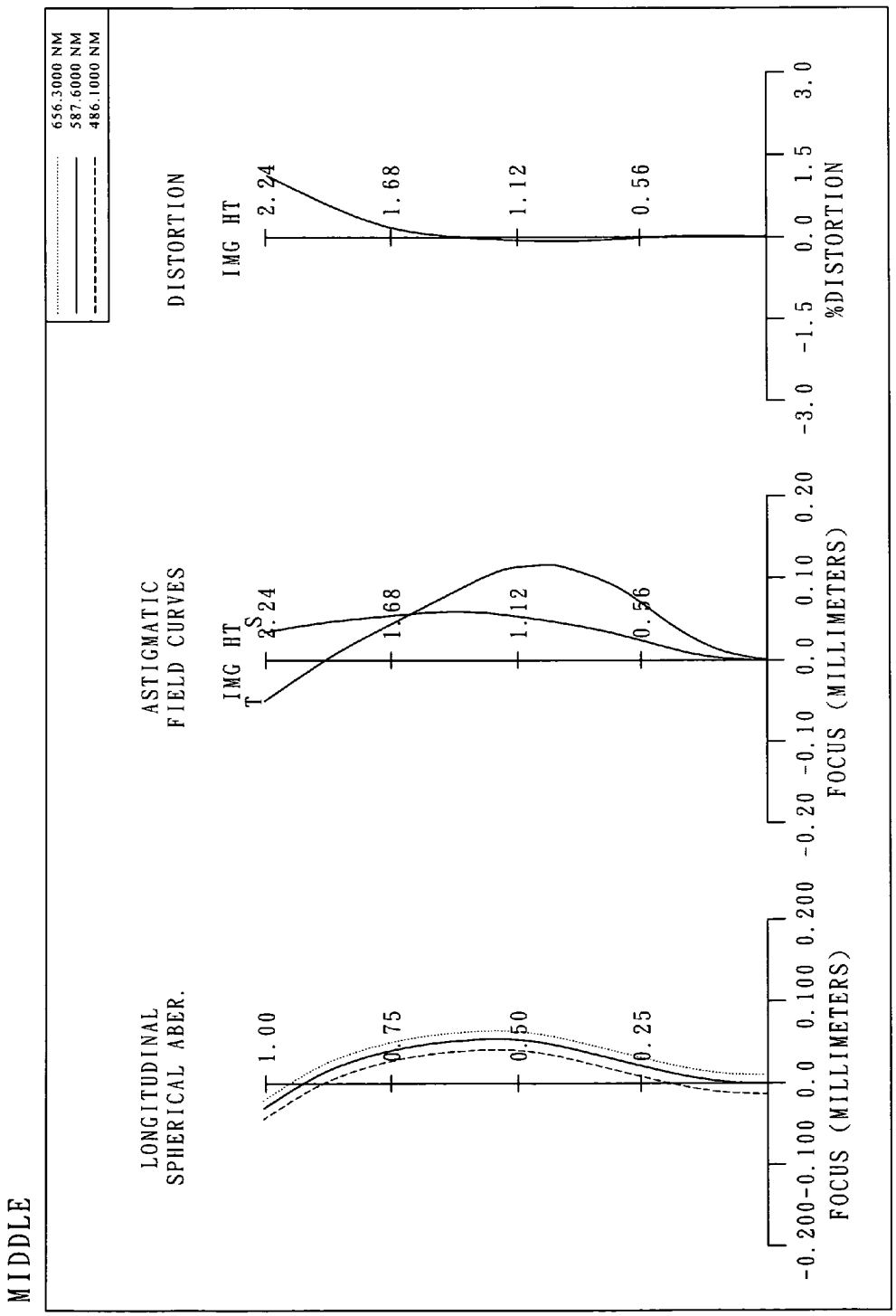
FIG. 3 shows the aberration curves of the first embodiment operated at the middle position.
Figure 4:
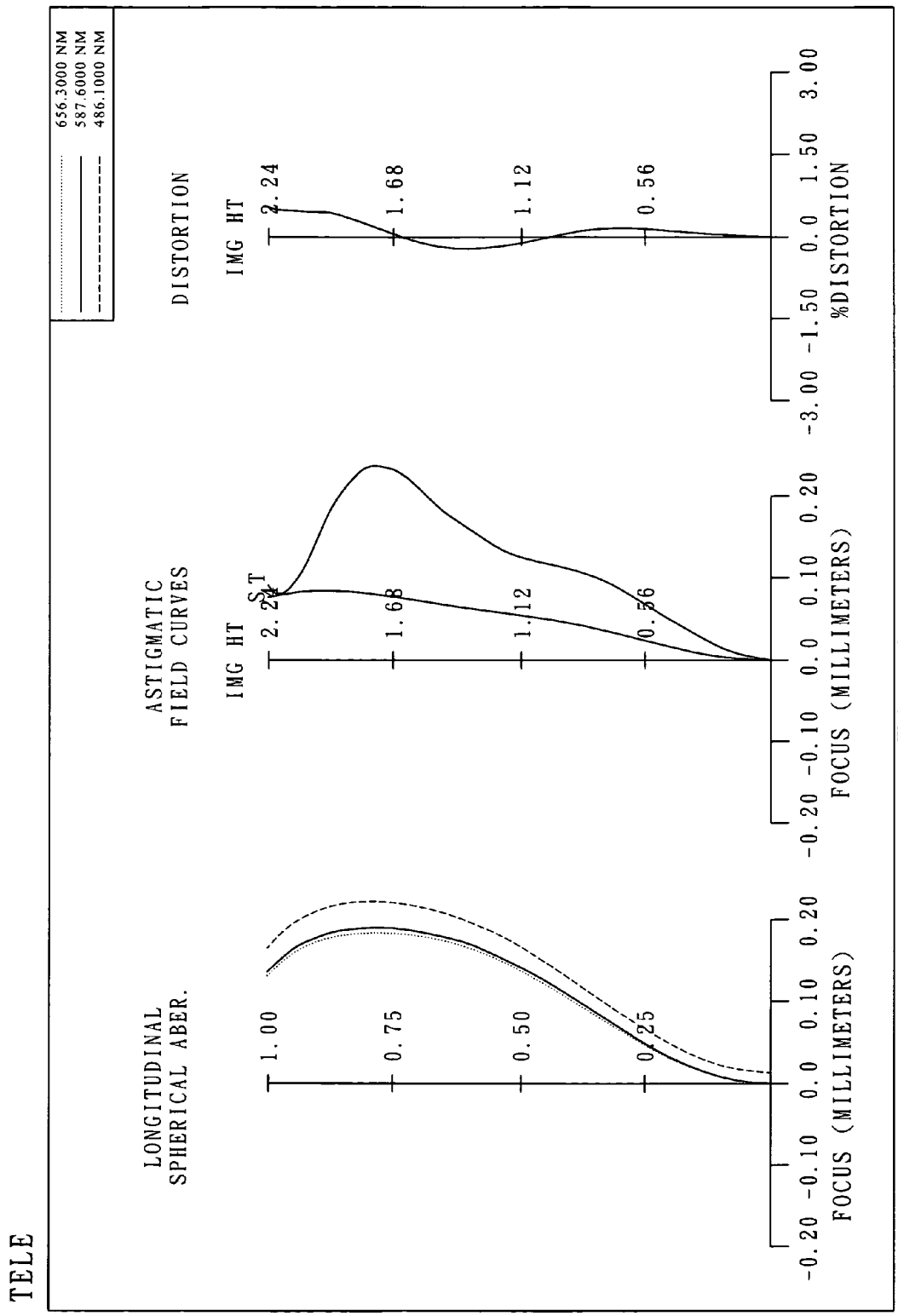
FIG. 4 shows the aberration curves of the first embodiment operated in the telephoto mode.

FIG. 1 shows an imaging lens system in accordance with a first embodiment of the present invention, and FIGS. 2-4 show the aberration curves of the first embodiment operated in the wide-angle mode (W), the middle position (M) and the telephoto mode (T), respectively. The imaging lens system of the first embodiment of the present invention mainly comprises three lens groups including, in order from the object side to the image side: a first lens group G1 with negative refractive power comprising a single plastic first lens element 100 with negative refractive power having a convex object-side surface 101 and a concave image-side surface 102, the object-side and image-side surfaces 101 and 102 of the first lens element 100 being aspheric; a second lens group G2 with positive refractive power comprising, in order from the object side to the image side: a plastic second lens element 110 with positive refractive power having a convex object-side surface 111 and a convex image-side surface 112, the object-side and image-side surfaces 111 and 112 of the second lens element 110 being aspheric; a plastic third lens element 120 with negative refractive power having a concave object-side surface 121 and a concave image-side surface 122, the object-side and image-side surfaces 121 and 122 of the third lens element 120 being aspheric; an aperture stop 130; an EDOF coding element 140, the EDOF coding element 140 being a WFC mask; and a plastic fourth lens element 150 with negative refractive power having a convex object-side surface 151 and a concave image-side surface 152, the object-side and image-side surfaces 151 and 152 of the fourth lens element 150 being aspheric; and a third lens group G3 with positive refractive power comprising a single plastic fifth lens element 160 with positive refractive power having a convex object-side surface 161 and a convex image-side surface 162, the object-side and image-side surfaces 161 and 162 of the fifth lens element 160 being aspheric; wherein by moving the first lens group G1 and the second lens group G2 along the optical axis while keeping the third lens group G3 stationary, the zooming operation is performed such that the system switches between the wide-angle mode (W) and the telephoto mode (T). The imaging lens system further includes an IR filter 170 disposed between the image-side surface 162 of the fifth lens element 160 and the image plane 180 and an electronic sensor disposed at the image plane 180 for an object to be imaged thereon. The IR filter 170 has no influence on the focal length of the imaging lens system.

The equation of the aspheric surface profiles is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens system, the focal length of the first lens group G1 is $f_{G1}$, the focal length of the second lens group G2 is $f_G$, and they satisfy the relation: $|f_{G1}/f_{G2}|=1.68$.

In the first embodiment of the present imaging lens system, the focal length of the imaging lens system in the wide-angle mode W is $f_W$, the focal length of the second lens group G2 is $f_{G2}$, the focal length of the third lens group G3 is $f_{G3}$, and they satisfy the relations: $f_W/f_{G2}=0.87$, $f_W/f_{G3}=0.28$.

In the first embodiment of the present imaging lens system, the radius of curvature of the object-side surface 101 of the first lens element 100 is R1, the radius of curvature of the image-side surface 102 of the first lens element 100 is R2, and they satisfy the relation: R1/R2=2.67.

In the first embodiment of the present imaging lens system, the radius of curvature of the object-side surface 111 of the second lens element 110 is R3, the radius of curvature of the image-side surface 112 of the second lens element 110 is R4, and they satisfy the relation: R3/R4=−0.21.

In the first embodiment of the present imaging lens system, the radius of curvature of the object-side surface 161 of the fifth lens element 160 is R9, the radius of curvature of the image-side surface 162 of the fifth lens element 160 is R10, and they satisfy the relation: R9/R10=−2.33.

In the first embodiment of the present imaging lens system, the Abbe number of the third lens element 120 is V3, the Abbe number of the fourth lens element 150 is V4, and they satisfy the relations: V3=23.4, V4=23.4.

In the first embodiment of the present imaging lens system, the total track length of the imaging lens system in the wide-angle mode W is $TTL_W$, the maximum image height of the imaging lens system is ImgH, and they satisfy the relation: $TTL_W/ImgH=5.06$.

In the first embodiment of the present imaging lens system, the total track length of the imaging lens system in the wide-angle mode W is $TTL_W$, the total track length of the imaging lens system in the telephoto mode T is $TIL_T$, and they satisfy the relation: $TTL_W/TTL_T=1.00$.

In the first embodiment of the present imaging lens system, the radius of curvature of the object-side surface 111 of the second lens element 110 is R3, the focal length of the imaging lens system in the wide-angle mode W is $f_W$, and they satisfy the relation: $R3/f_W=0.51$.

The detailed optical data of the first embodiment is shown in FIG. 9 (TABLE 1), and the aspheric surface data is shown in FIG. 10 (TABLE 2), wherein the units of the radius of curvature, the thickness and the focal length are expressed in mm, Fno is the f-number, and HFOV is half of the field of view. As shown in FIG. 9 (TABLE 1), the values of the on-axis spacing between the first lens element 100 and the second lens element 110 are 4.931 mm, 3.456 mm and 2.023 mm and the values of the on-axis spacing between the fourth lens element 150 and the fifth lens element 160 are 0.450 mm, 1.345 mm and 3.358 mm when the imaging lens system is in the wide-angle mode W, the middle position M and the telephoto mode T, respectively. Referring to FIG. 13 (TABLE 5), the values of the focal length of the imaging lens system are 2.97 mm, 4.13 mm and 6.71 mm, the values of the f-number are 3.40, 4.20 and 5.90 and the values of the half of the field of view are 37.6 degrees, 28.1 degrees and 18.2 degrees when the imaging lens system is in the wide-angle mode W, the middle position M and the telephoto mode T, respectively.

Figure 5:
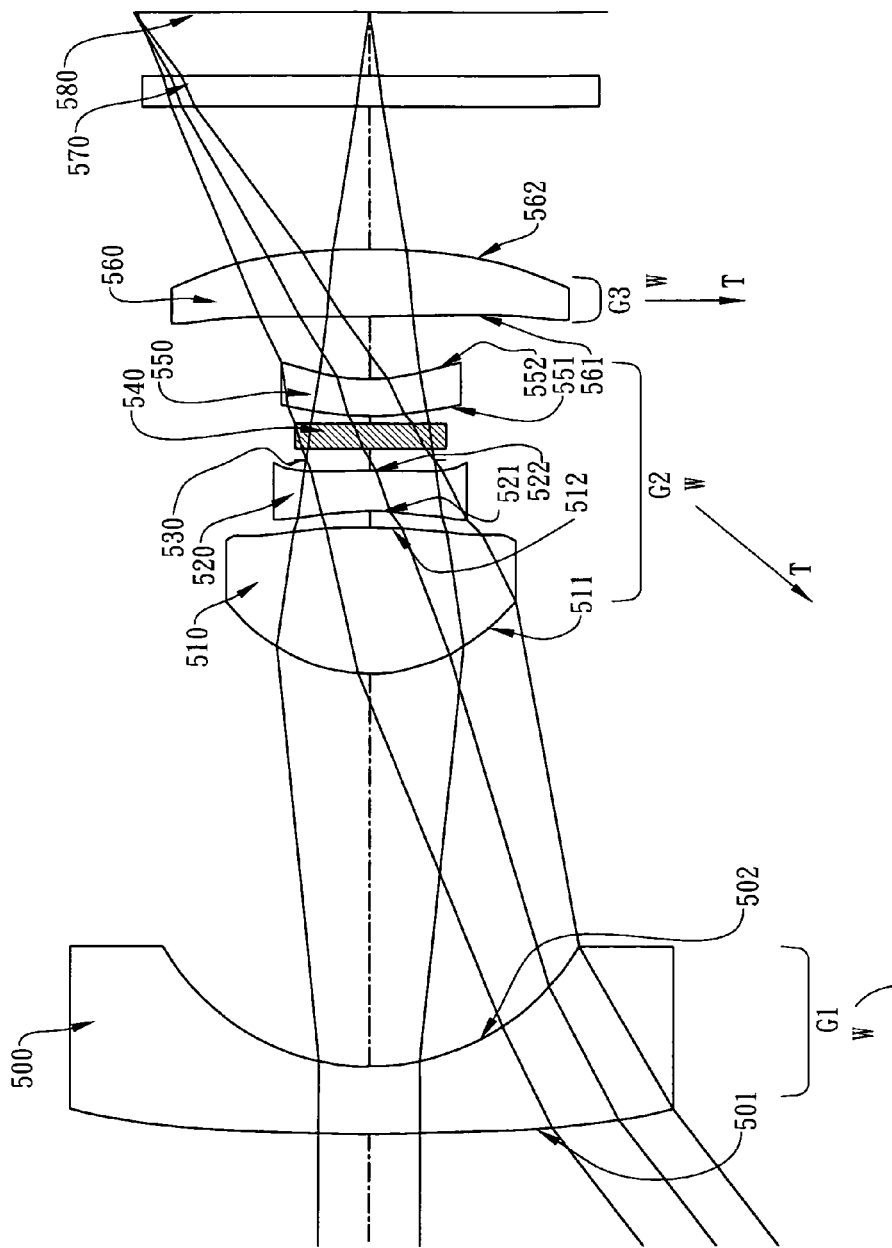
FIG. 5 shows an imaging lens system in accordance with a second embodiment of the present invention.
Figure 6:
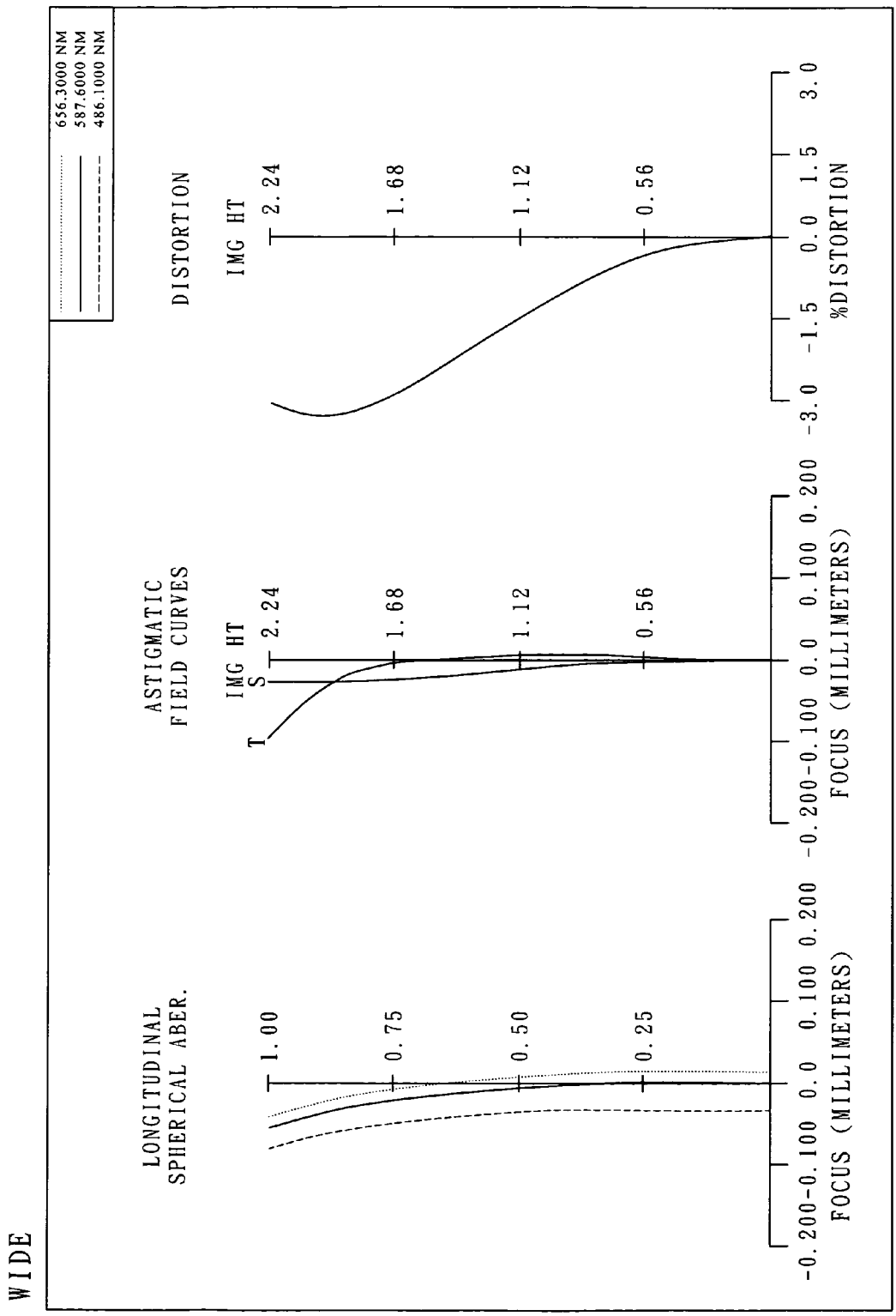
FIG. 6 shows the aberration curves of the second embodiment operated in the wide-angle mode.
Figure 7:
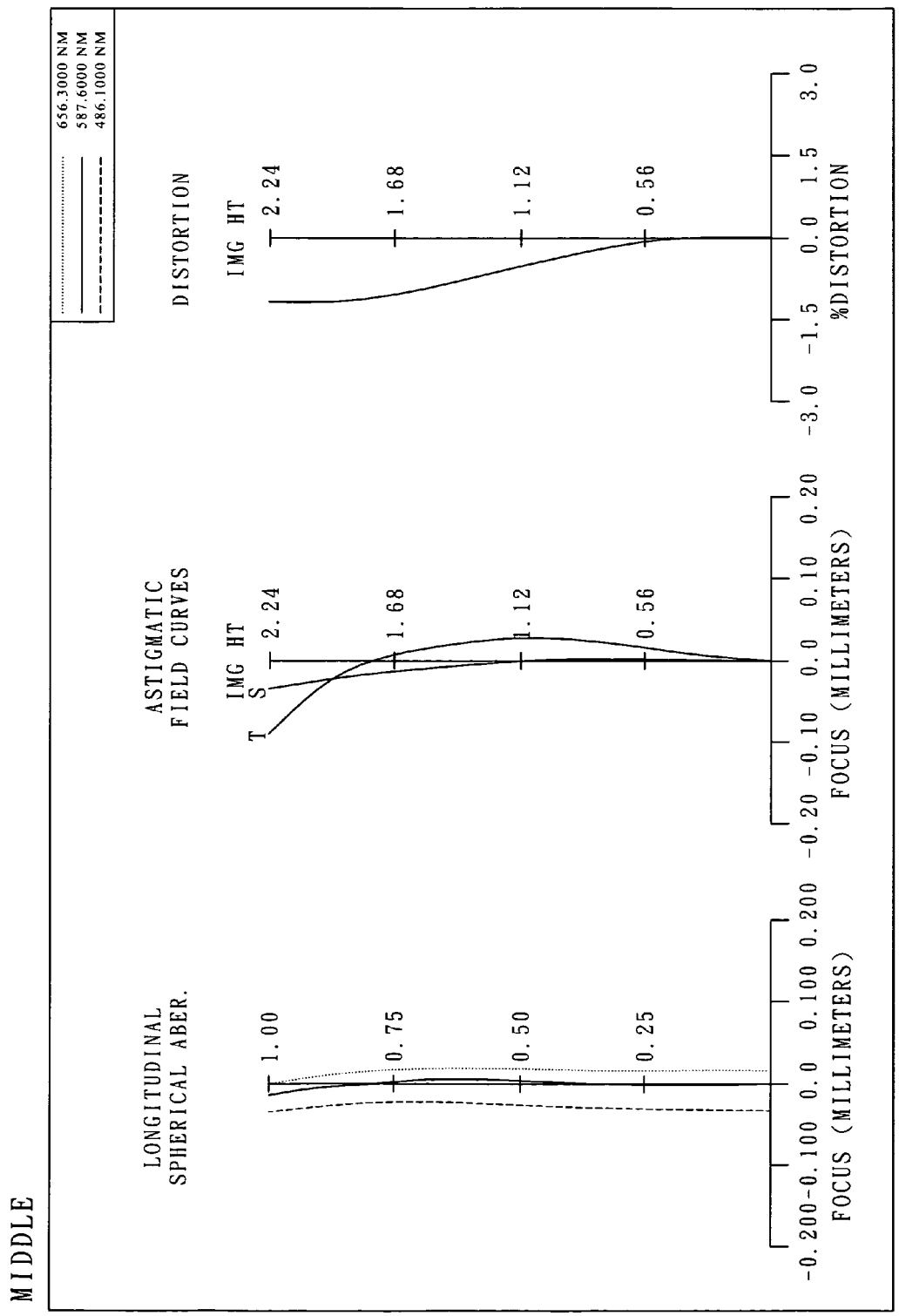
FIG. 7 shows the aberration curves of the second embodiment operated at the middle position.
Figure 8:
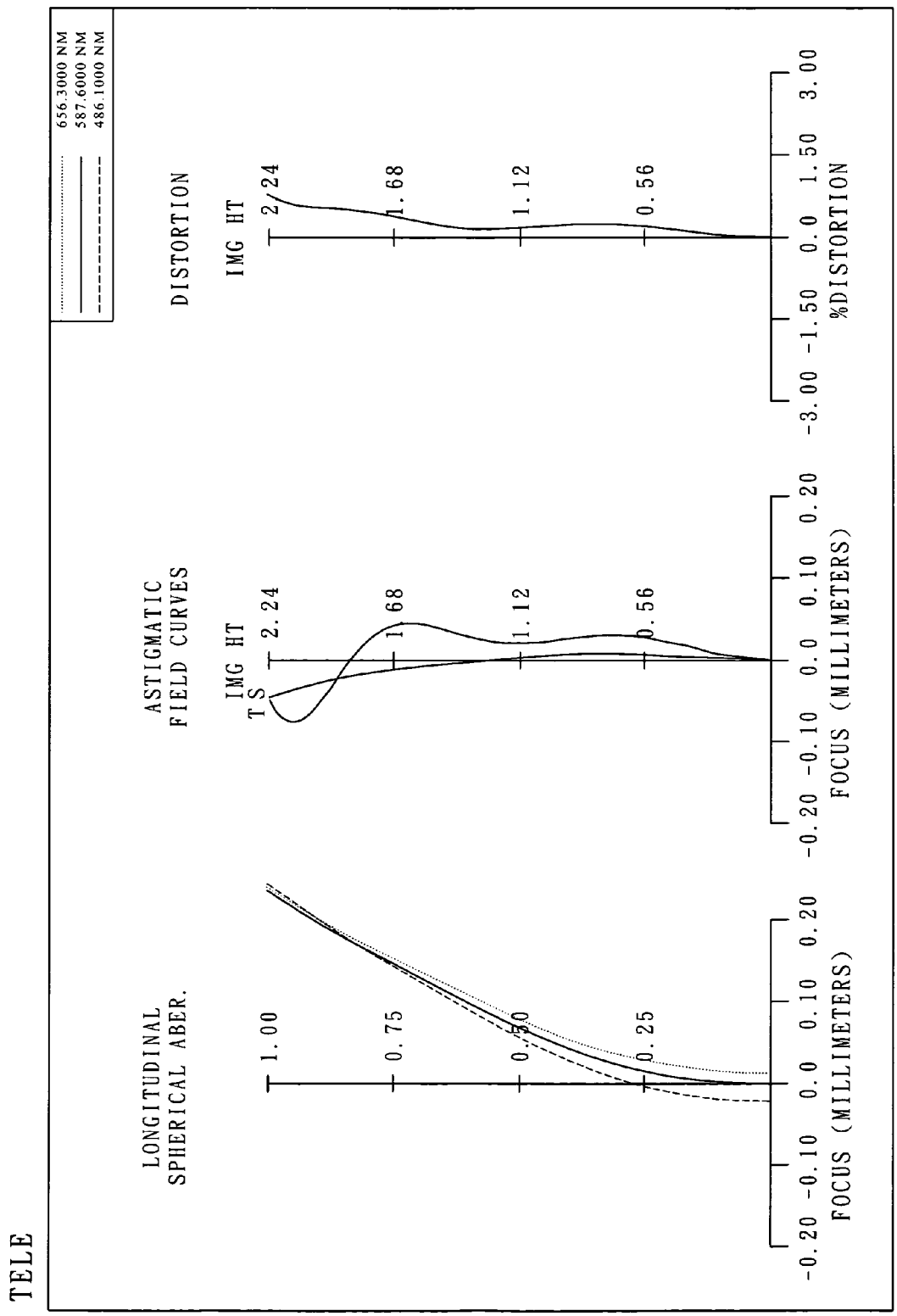
FIG. 8 shows the aberration curves of the second embodiment operated in the telephoto mode.

FIG. 5 shows an imaging lens system in accordance with a second embodiment of the present invention, and FIGS. 6-8 show the aberration curves of the second embodiment operated in the wide-angle mode W, the middle position M and the telephoto mode T, respectively. The imaging lens system of the second embodiment of the present invention mainly comprises three lens groups including, in order from the object side to the image side: a first lens group G1 with negative refractive power comprising a single glass first lens element 500 with negative refractive power having a convex object-side surface 501 and a concave image-side surface 502, the object-side and image-side surfaces 501 and 502 of the first lens element 500 being aspheric; a second lens group G2 with positive refractive power comprising, in order from the object side to the image side: a plastic second lens element 510 with positive refractive power having a convex object-side surface 511 and a convex image-side surface 512, the object-side and image-side surfaces 511 and 512 of the second lens element 510 being aspheric; a plastic third lens element 520 with negative refractive power having a concave object-side surface 521 and a convex image-side surface 522, the object-side and image-side surfaces 521 and 522 of the third lens element 520 being aspheric; an aperture stop 530; an EDOF coding element 540, the EDOF coding element 540 being a WFC mask; and a plastic fourth lens element 550 with negative refractive power having a convex object-side surface 551 and a concave image-side surface 552, the object-side and image-side surfaces 551 and 552 of the fourth lens element 550 being aspheric; and a third lens group G3 with positive refractive power comprising a single plastic fifth lens element 560 with positive refractive power having a convex object-side surface 561 and a convex image-side surface 562, the object-side and image-side surfaces 561 and 562 of the fifth lens element 560 being aspheric; wherein by moving the first lens group G1 and the second lens group G2 along the optical axis while keeping the third lens group G3 stationary, the zooming operation is performed such that the system switches between the wide-angle mode W and the telephoto mode T. The imaging lens system further includes an IR filter 570 disposed between the image-side surface 562 of the fifth lens element 560 and the image plane 580 and an electronic sensor disposed at the image plane 580 for an object is to be imaged thereon. The IR filter 570 has no influence on the focal length of the imaging lens system.

The equation of the aspheric surface profiles of the second embodiment has the same form as that of the first embodiment.

In the second embodiment of the present imaging lens system, the focal length of the first lens group G1 is $f_{G1}$, the focal length of the second lens group G2 is $f_{G2}$, and they satisfy the relation: $|f_{G1}/f_{G2}|=1.43$.

In the second embodiment of the present imaging lens system, the focal length of the imaging lens system in the wide-angle mode W is $f_W$, the focal length of the second lens group G2 is $f_{G2}$, the focal length of the third lens group G3 is $f_{G3}$, and they satisfy the relations: $f_W/f_{G2}=0.91$, $f_W/f_{G3}=0.24$.

In the second embodiment of the present imaging lens system, the radius of curvature of the object-side surface 501 of the first lens element 500 is R1, the radius of curvature of the image-side surface 502 of the first lens element 500 is R2, and they satisfy the relation: R1/R2=11.66.

In the second embodiment of the present imaging lens system, the radius of curvature of the object-side surface 511 of the second lens element 510 is R3, the radius of curvature of the image-side surface 512 of the second lens element 510 is R4, and they satisfy the relation: R3/R4=−0.27.

In the second embodiment of the present imaging lens system, the radius of curvature of the object-side surface 561 of the fifth lens element 560 is R9, the radius of curvature of the image-side surface 562 of the fifth lens element 560 is R10, and they satisfy the relation: R9/R10=−4.23.

In the second embodiment of the present imaging lens system, the Abbe number of the third lens element 520 is V3, the Abbe number of the fourth lens element 550 is V4, and they satisfy the relations: V3=23.4, V4=23.4.

In the second embodiment of the present imaging lens system, the total track length of the imaging lens system in the wide-angle mode W is $TTL_W$, the maximum image height of the imaging lens system is ImgH, and they satisfy the relation: $TTL_W/ImgH=4.76$.

In the second embodiment of the present imaging lens system, the total track length of the imaging lens system in the wide-angle mode W is $TTL_W$, the total track length of the imaging lens system in the telephoto mode T is $TTL_T$, and they satisfy the relation: $TTL_W/TTL_T=0.92$.

In the second embodiment of the present imaging lens system, the radius of curvature of the object-side surface 511 of the second lens element 510 is R3, the focal length of the imaging lens system in the wide-angle mode W is $f_W$, and they satisfy the relation: $R3/f_W=0.52$.

The detailed optical data of the second embodiment is shown in FIG. 11 (TABLE 3), and the aspheric surface data is shown in FIG. 12 (TABLE 4), wherein the units of the radius of curvature, the thickness and the focal length are expressed in mm, Fno is the f-number, and HFOV is half of the field of view. As shown in FIG. 11 (TABLE 3), the values of the on-axis spacing between the first lens element 500 and the second lens element 510 are 3.769 mm, 2.738 mm and 1.567 mm and the values of the on-axis spacing between the fourth lens element 550 and the fifth lens element 560 are 0.559 mm, 1.461 mm and 3.714 mm when the imaging lens system is in the wide-angle mode W, the middle position M and the telephoto mode T, respectively. Referring to FIG. 13 (TABLE 5), the values of the focal length of the imaging lens system are 3.04 mm, 4.05 mm and 6.55 mm, the values of the f-number are 3.40, 4.30 and 5.70 and the values of the half of the field of view are 37.3 degrees, 29.2 degrees and 18.6 degrees when the imaging lens system is in the wide-angle mode W, the middle position M and the telephoto mode T, respectively.

It is to be noted that TABLES 1-4 (illustrated in FIGS. 9-12 respectively) show different data of the different embodiments, however, the data of the different embodiments are obtained from experiments. Therefore, any imaging lens system of the same structure is considered to be within the scope of the present invention even if it uses different data. The embodiments depicted above are exemplary and are not intended to limit the claim scope of the present invention. TABLE 5 (illustrated in FIG. 13) shows the data of the respective embodiments resulted from the equations.

As described above, the aforementioned arrangement of optical elements can effectively reduce the total track length and sensitivity of the imaging lens system and improve the image quality.

What is claimed is:
1. An imaging lens system including, in order from an object side to an image side:
   a first lens group comprising a first lens element having a convex object-side surface; and
   a second lens group comprising a second lens element with positive refractive power; wherein the imaging lens system further includes an EDOF coding element, and an object is imaged on an electronic sensor;
   wherein by moving the first lens group and the second lens group along an optical axis, the zooming operation is performed such that the system switches between a wide-angle mode and a telephoto mode; and
   wherein a radius of curvature of the object-side surface of the first lens element is R1, a radius of curvature of an image-side surface of the first lens element is R2, a radius of curvature of an object-side surface of the second lens element is R3, a focal length of the imaging lens system in the wide-angle mode is $f_W$, and they satisfy the relations:

1.5<$R1/R2$; and 0.4<$R3/f_W$<0.6.

2. The imaging lens system according to claim 1, wherein the EDOF coding element is disposed in the second lens group.

3. The imaging lens system according to claim 2, wherein the first lens group has negative refractive power and comprises a first lens element with negative refractive power having a convex object-side surface and a concave image-side surface, and the second lens group has positive refractive power and comprises, in order from the object side to the image side:
 a second lens element with positive refractive power;
 a third lens element with negative refractive power;
 an aperture stop; and
 a fourth lens element with negative refractive power.

4. The imaging lens system according to claim 3, wherein no lens element with refractive power is disposed between the EDOF coding element and the aperture stop.

5. The imaging lens system according to claim 3, wherein the number of the lens elements with refractive power is N, and it satisfies the relation: 5≦N≦6.

6. The imaging lens system according to claim 5, wherein a total track length of the imaging lens system in the wide-angle mode is $TTL_W$, a maximum image height of the imaging lens system is ImgH, and they satisfy the relation: $TTL_W$/ImgH<6.

7. The imaging lens system according to claim 3, wherein the second lens element has a convex object-side surface and a convex image-side surface, the third lens element has a concave object-side surface and the fourth lens element has a convex object-side surface and a concave image-side surface.

8. The imaging lens system according to claim 3, wherein a focal length of the first lens group is $f_{G1}$, a focal length of the second lens group is $f_{G2}$, and they satisfy the relation: 1.35<|$f_{G1}/f_{G2}$|<1.75.

9. The imaging lens system according to claim 3, wherein an Abbe number of the third lens element is V3, an Abbe number of the fourth lens element is V4, and they satisfy the relations: 20<V3<28, 20<V4<28.

10. An imaging lens system including, in order from an object side to an image side:
 a first lens group with negative refractive power and comprising a first lens element with negative refractive power having a convex object-side surface and a concave image-side surface; and
 a second lens group with positive refractive power and comprises, in order from the object side to the image side:
 a second lens element with positive refractive power
 a third lens element with negative refractive power;
 an aperture stop; and
 a fourth lens element with negative refractive power;
 wherein the imaging lens system further includes an EDOF coding element disposed in the second lens group, and an object is imaged on an electronic sensor;
 wherein by moving the first lens group and the second lens group along an optical axis, the zooming operation is performed such that the system switches between a wide-angle mode and a telephoto mode.

11. The imaging lens system according to claim 10, wherein no lens element with refractive power is disposed between the EDOF coding element and the aperture stop.

12. The imaging lens system according to claim 10, wherein the number of the lens elements with refractive power is N, and it satisfies the relation: 5≦N≦6.

13. The imaging lens system according to claim 12, wherein a total track length of the imaging lens system in the wide-angle mode is $TTL_W$, a maximum image height of the imaging lens system is ImgH, and they satisfy the relation: $TTL_W$/ImgH<6.

14. The imaging lens system according to claim 10, wherein the second lens element has a convex object-side surface and a convex image-side surface, the third lens element has a concave object-side surface and the fourth lens element has a convex object-side surface and a concave image-side surface.

15. The imaging lens system according to claim 10, wherein a focal length of the first lens group is $f_{G1}$, a focal length of the second lens group is $f_{G2}$, and they satisfy the relation: 1.35<|$f_{G1}/f_{G2}$|<1.75.

16. The imaging lens system according to claim 10, wherein an Abbe number of the third lens element is V3, an Abbe number of the fourth lens element is V4, and they satisfy the relations: 20<V3<28, 20<V4<28.

* * * * *